(12) United States Patent
Chen

(10) Patent No.: US 6,392,997 B1
(45) Date of Patent: *May 21, 2002

(54) TECHNIQUE FOR GROUP-BASED ROUTING UPDATE WITH LIMITED PER NEIGHBOR/ADJACENCY CUSTOMIZATION

(75) Inventor: Enke Chen, San Jose, CA (US)

(73) Assignee: Cisco Technology, Inc., San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/270,557

(22) Filed: Mar. 16, 1999

(51) Int. Cl.[7] .................... H04L 12/28; H04L 12/56; H04J 3/26; G06F 15/173
(52) U.S. Cl. ............... 370/252; 370/390; 370/401; 370/432; 709/223; 709/242
(58) Field of Search .................... 370/252, 256, 370/257, 258, 392, 399, 401, 408, 409, 432, 255, 351, 395, 466, 390; 709/242, 223, 238, 241; 395/200.75, 200.68, 200.71, 200.69

(56) References Cited

U.S. PATENT DOCUMENTS

| | | | |
|---|---|---|---|
| 5,519,704 A * | 5/1996 | Farinacci et al. | 370/252 |
| 5,856,974 A * | 1/1999 | Gervais et al. | 370/392 |
| 5,881,243 A * | 3/1999 | Zaumen et al. | 395/200.71 |
| 5,898,687 A | 4/1999 | Harriman et al. | |
| 5,917,820 A | 6/1999 | Rekhter | |
| 5,959,989 A | 9/1999 | Gleeeson et al. | |
| 5,964,841 A * | 10/1999 | Rekhter | 709/242 |
| 6,078,590 A | 6/2000 | Farinacci et al. | |
| 6,094,525 A * | 7/2000 | Perlman et al. | 395/200.75 |
| 6,167,444 A * | 12/2000 | Boden et al. | 709/223 |
| 6,173,324 B1 * | 1/2001 | D'Souza | 709/224 |
| 6,260,070 B1 * | 7/2001 | Shah | 709/230 |
| 6,295,296 B1 | 9/2001 | Tappan | |

OTHER PUBLICATIONS

Chandra, Ravi and John Scudder, World Wide Web page http://www.ietf.org/internet-drafts/draft-ietf-idr-bgp4-cap-neg-03.txt, "Capabilities Negotiation with BGP-3", posted Mar. 10, 1999, pp. 1–4.

Chen, Enke, World Wide Web page http://www.search.ietf.org/internet-drafts-chen-bgp-route-refresh-01.txt, "Route Refresh Capability for BGP-4", posted Apr. 2, 1999, pp. 1–4.

Tony Bates, et al., World Wide Web page http://www.search.ietf.org/internet-drafts/draft-ietf-idr-bgp4-multiprotocol-v2-02.txt, "Multiprotocol Extensions for BGP-4", posted Apr. 2, 1999, pp. 1–10.

Perlman, Radia, "Interconnections: Bridges and Routers", Copyright 1992, pp. 323–329.

(List continued on next page.)

*Primary Examiner*—Wellington Chin
*Assistant Examiner*—M. Phan
(74) *Attorney, Agent, or Firm*—Cesari and McKenna, LLP; Charles J. Barbas; A. SIdney Johnston (57) ABSTRACT

An improved group-based routing update technique allows limited per neighbor customization of routing update messages generated by an interdomain router for its neighboring peer routers within autonomous systems of a computer network. The technique may be employed when the neighboring peer routers share identical routing policies, but the routing update messages differ only in certain attributes with known locations and lengths. Appropriate values of the location and length attributes for each neighboring router are calculated and stored during a replication stage of the improved technique. Before each message is transmitted, the proper location and length attributes of the message are updated with the stored values for the respective neighbor.

28 Claims, 5 Drawing Sheets

OTHER PUBLICATIONS

Cisco IOS Release 11.3, "Network Protocols Configuration Guide, Part 1", Copyright 1997, pp. P1C–160—P1C–161.

Y. Rekhter, et al., World Wide Web page http://www.ietf.org/internet–drafts/draft–ietf–idr–bgp4–08.txt, "A Border Gateway Protocol 4 (BGP–4)", posted Mar. 10, 1999, pp. 1–54.

World Wide Web page http://www.cisco.com/univercd/cc/t . . . s120/12cgcr/np1_c/1cprt1/1cbgp.htm, posted Feb. 9, 1999, "Configuring BGP", pp. 1–44.

World Wide Web page http://www.optimized.com/COMPENDI/IP–Routg.htm, "IP Routing: Understanding Routing with IP", posted Sep. 27, 1999, pp. 1–3.

Y. Rekhter and T. Li, Request For Comments (RFC) 1771.

Tanenbaum, Computer Networks, 3rd Edition, 1996, Prentice–Hall, pp. 479–576.

* cited by examiner

TECHNIQUE FOR GROUP-BASED ROUTING UPDATE WITH LIMITED PER NEIGHBOR/ADJACENCY CUSTOMIZATION

FIELD OF THE INVENTION

This invention relates generally to computer networks and, more particularly, to routing updates associated with routing protocols used in a computer network.

BACKGROUND OF THE INVENTION

A computer network is a geographically distributed collection of interconnected communication links for transporting data between nodes, such as computers. Many types of computer networks are available, with the types ranging from Local Area Networks (LANs) to Wide Area Networks (WANs). The nodes typically communicate by exchanging discrete frames or packets of data according to pre-defined protocols. In this context, a protocol consists of a set of rules defining how the nodes interact with each other.

Computer networks may be further interconnected by an intermediate node, called a router, to extend the effective "size" of each network. Since management of a large system of interconnected computer networks can prove burdensome, smaller groups of computer networks may be maintained as autonomous systems or routing domains. The networks within a routing domain are typically coupled together by conventional "intradomain" routers. Yet it still may be desirable to increase the number of nodes capable of exchanging data; in this case, "interdomain" routers executing interdomain routing protocols are used to interconnect nodes of the various autonomous systems. An example of an interdomain routing protocol is the Border Gateway Protocol (BGP) which performs routing between autonomous systems by exchanging routing and reachability information among interdomain routers of the systems. The interdomain routers configured to execute the BGP protocol, called BGP routers, maintain routing tables, transmit routing update messages and render routing decisions based on routing metrics.

Specifically, each BGP router maintains a routing table that lists all feasible paths to a particular network. Periodic refreshing of the routing table is generally not performed; however, BGP peer routers residing in the autonomous systems exchange routing information under certain circumstances. For example, when a BGP router initially connects to the network, the peer routers exchange the entire contents of their routing tables. Thereafter when changes occur to those contents, the routers exchange only those portions of their routing tables that change in order to update their peers' tables. These update messages, which are sent in response to routing table changes, advertise only an optimal path to a particular network. The optimal path is advertised as a single routing metric consisting of an arbitrary unit number that specifies a degree of preference for a particular link. The BGP routing protocol is well-known and described in detail in Re-quest For Comments (RFC) 1771, by Y. Rekhter and T. Li (1995), and Interconnections, Bridges and Routers, by R. Perlman, published by Addison Wesley Publishing Company, at pages 323–329 (1992), all disclosures of which are hereby incorporated by reference.

Broadly stated, a BGP router generates routing update messages for an adjacency or neighbor peer router by "walking-through" the routing table and applying appropriate routing policies. A routing policy is information that enables a BGP router to rank routes according to filtering and preference (i.e., the "optimal route"). Routing updates provided by the update message allows BGP routers of the autonomous systems to construct a consistent view of the network topology. The update messages are typically sent using a reliable transport, such as the Transmission Control Protocol (TCP), to ensure reliable delivery. TCP is a transport protocol implemented by a transport layer of the Internet Protocol (IP) architecture; the term TCP/IP is commonly used to denote this architecture. The TCP/IP architecture is well-known and described in Computer Networks, 3rd Edition, by Andrew S. Tanenbaum, published by Prentice-Hall (1996).

When more than one neighbor share similar routing policies and these neighbors share a common subnetwork, "identical" update messages may be sent by a BGP router to these neighboring peers of the autonomous systems. In this context, a common sub-network (subnet) is defined as a shared medium, such as a LAN, that allows the updating router to access its neighboring peer routers through a single network interface. When the neighbors share a common subnet, a grouped-based routing arrangement may be further employed that optimizes generation of the identical routing update messages. That is, the BGP router may generate an update message for one neighbor and then replicate that message for all other neighbors in accordance with a conventional replication process.

Specifically, the router generates the actual data contained in the update message and stores that data in a memory location of the router. The router then generates a header for each neighbor receiving the update; the header includes a pointer referencing the address of the message data location in memory. The router then processes each header to construct a message for each neighbor and transmits the messages such that each neighbor receives an identical copy of the actual message data. In a large network, the technique of grouping neighboring peer routers according to common subnets substantially reduces memory and processor utilization, thereby increasing the rate of (i.e., speeding-up) routing updates.

However, an inconsistent routing situation arises if the grouped-based routing arrangement is employed with a set of neighboring peer routers that do not share a common subnet. In other words, if multiple external BGP neighbors span multiple networks, the neighbors cannot be grouped by a common subnet because a next-hop attribute of the routing update message is different for each of these neighbors. The update routing message is thus not "identical" for each neighbor even if these neighbors share identical routing policies, and use of the conventional grouping arrangement results in incorrect (or misformatted) update messages being sent to the BGP peer receivers.

Accordingly, the routing update message must be generated separately for each neighboring peer router that does not share the common subnet. Separate generation of update messages causes substantial processor and memory resource consumption at the updating router which, in turn, limits router update performance. The present invention is directed to solving this problem and, in particular, to providing a technique for efficiently generating update messages for neighboring peer routers that do not share a common subnet.

SUMMARY OF THE INVENTION

The invention comprises an improved group-based routing update technique that allows limited per neighbor customization of routing update messages generated by an interdomain router for its neighboring peer routers within autonomous systems of a computer network. The inventive technique may be employed when the neighboring peer routers share identical routing policies, but the routing update messages differ only in certain attributes with known locations and lengths. Broadly stated, appropriate values of the location and length attributes for each neighboring router are calculated and stored during a novel replication stage of the inventive technique. Before each message is transmitted, the proper location and length attributes of the message are updated with the stored values for the respective neighbor.

In accordance with the inventive technique, the interdomain router generates a routing update message comprising a message data portion and further generates a plurality of headers, each associated with a neighboring peer router. Each header contains a plurality of pointers, one of which references the beginning of the message data portion stored in a memory of the interdomain router (the message pointer) and another of which references a location (the referenced field) within the message data portion that requires customization for each neighbor (the field pointer). The header further contains an actual value to be loaded into the referenced field for each neighbor router.

Operationally, the interdomain router initially generates a routing update message (including the message data portion) for a first neighbor. The router also generates a first header that contains the message pointer and the field pointer, along with a first value to be loaded into the referenced field of the message data portion for the first neighbor. The update message is then replicated for a second neighbor by creating a second header containing the message pointer and the field pointer; this time, however, the second header contains a second value to be loaded into the referenced field for the second neighbor. The replication process is repeated for each neighboring peer router receiving the routing update message. Immediately before transmitting the routing message to each neighbor, the content of the referenced field in the message data portion is replaced by the value contained in the header for each neighboring peer router. Thereafter, the message is transmitted to each neighbor.

Thus, instead of generating different copies of the routing update message for each neighboring peer router, a single data portion of the update message is created and only a specific field of that message is customized for each neighbor prior to transmitting the message to that neighbor. Advantageously, the inventive technique substantially conserves memory and processor resources when generating and transmitting routing update messages in a large network.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
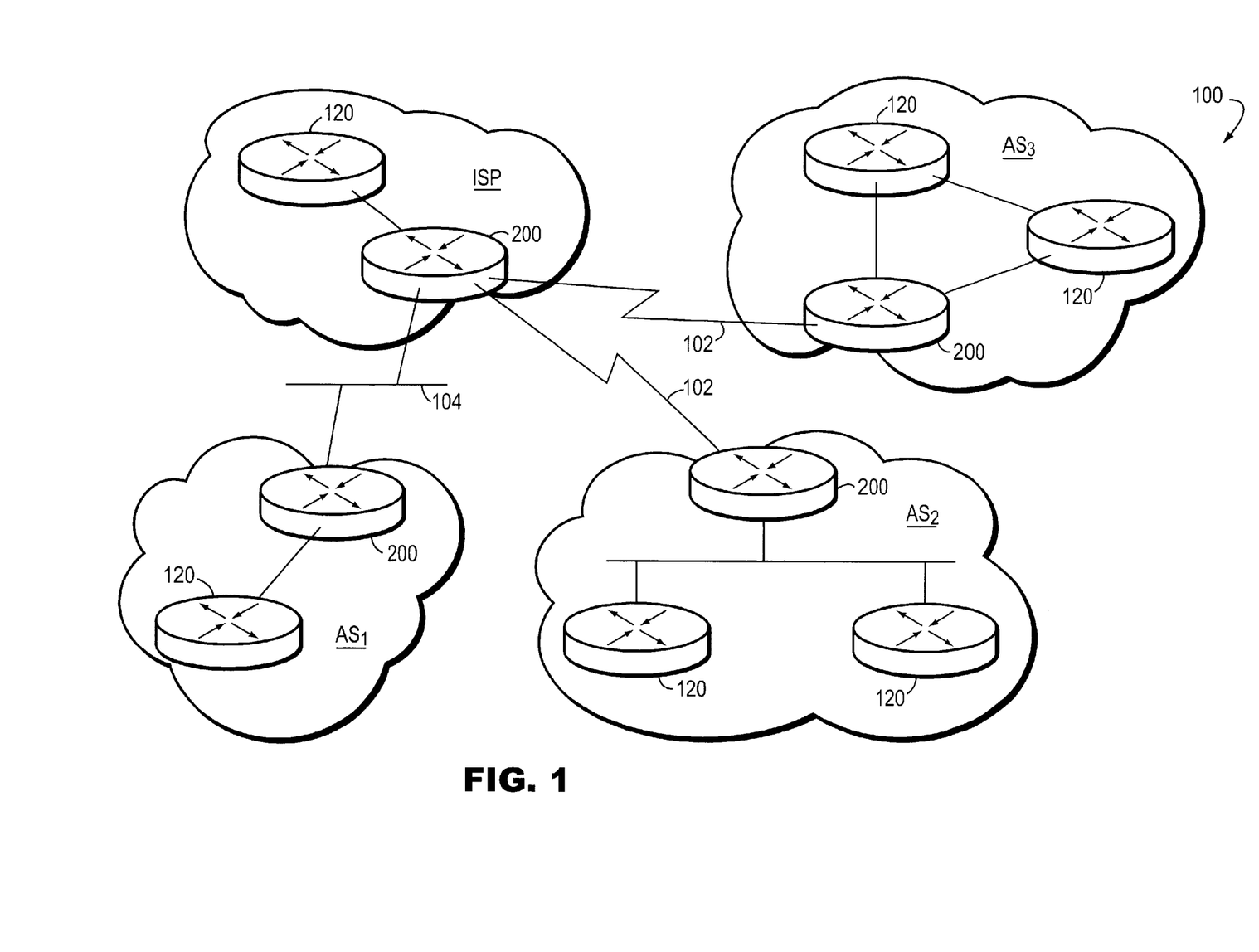
FIG. 1 is a schematic block diagram of a computer network comprising a plurality of autonomous systems or routing domains interconnected by intermediate nodes, such as interdomain routers.

FIG. 1 is a schematic block diagram of a computer network 100 comprising a plurality of autonomous systems or routing domains interconnected by intermediate nodes, such as conventional intradomain routers 120 and interdomain routers 200. The autonomous systems include an Internet Service Provider (ISP) domain and various routing domains ($AS_{1-3}$) interconnected by the interdomain routers 200. The interdomain routers 200 are further interconnected by shared medium networks 104, such as Local Area Networks (LANs), and point-to-point links 102, such as frame relay links, asynchronous transfer mode links or other serial links. Communication among the routers is typically effected by exchanging discrete data frames or packets in accordance with predefined protocols, such as the Transmission Control Protocol/Internet Protocol (TCP/IP). It will be understood to those skilled in the art that other protocols, such as the Internet Packet Exchange (IPX) protocol, may be advantageously used with the present invention.

Figure 2:
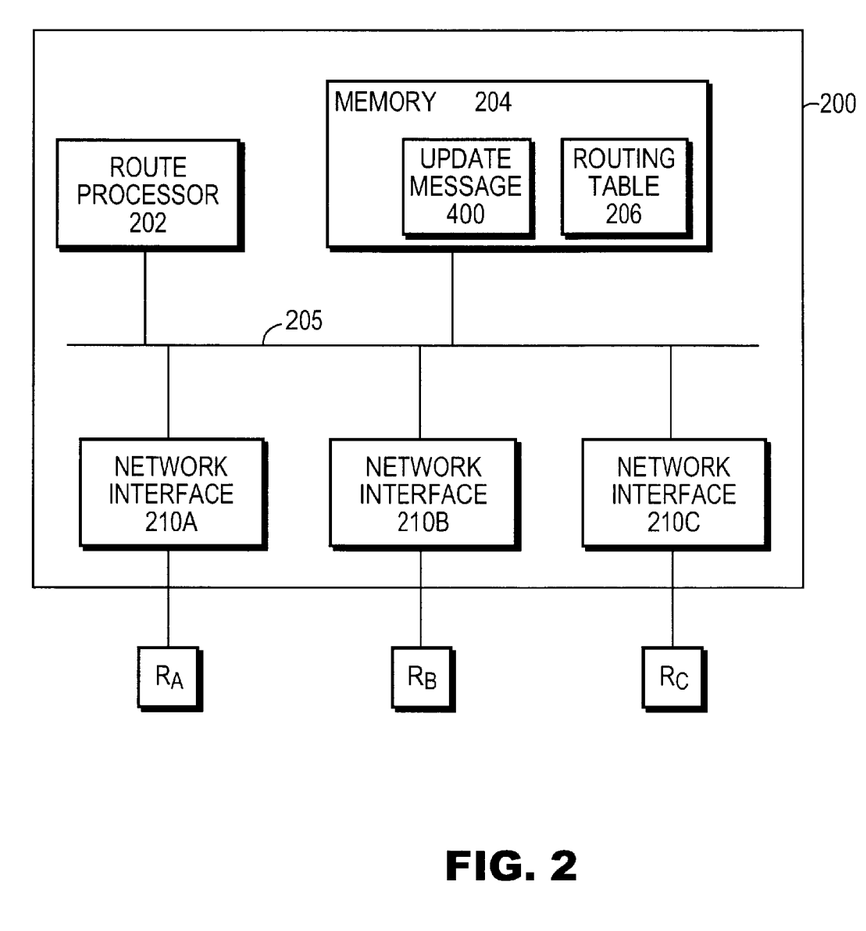
FIG. 2 is a schematic block diagram of an interdomain router comprising a route processor coupled to a memory and a plurality of network interfaces.

Each router typically comprises a plurality of interconnected elements, such as a processor, a memory and a network interface adapter. FIG. 2 is a schematic block diagram of an interdomain router 200 comprising a route processor 202 coupled to a memory 204 and a plurality of network interface adapters $210_{A-C}$ via a bus 205. The memory 204 may comprise storage locations addressable by the processor and interface adapters for storing software programs and data structures associated with the inventive routing update mechanism and technique. The route processor 202 may comprise processing elements or logic for executing the software programs and manipulating the data structures. An operating system, portions of which are typically resident in memory 204 and executed by the route processor, functionally organizes the router by, inter alia, invoking network operations in support of software processes executing on the router. It will be apparent to those skilled in the art that other processor and memory means, including various computer readable media, may be used for storing and executing program instructions pertaining to the inventive technique described herein.

Figure 3:
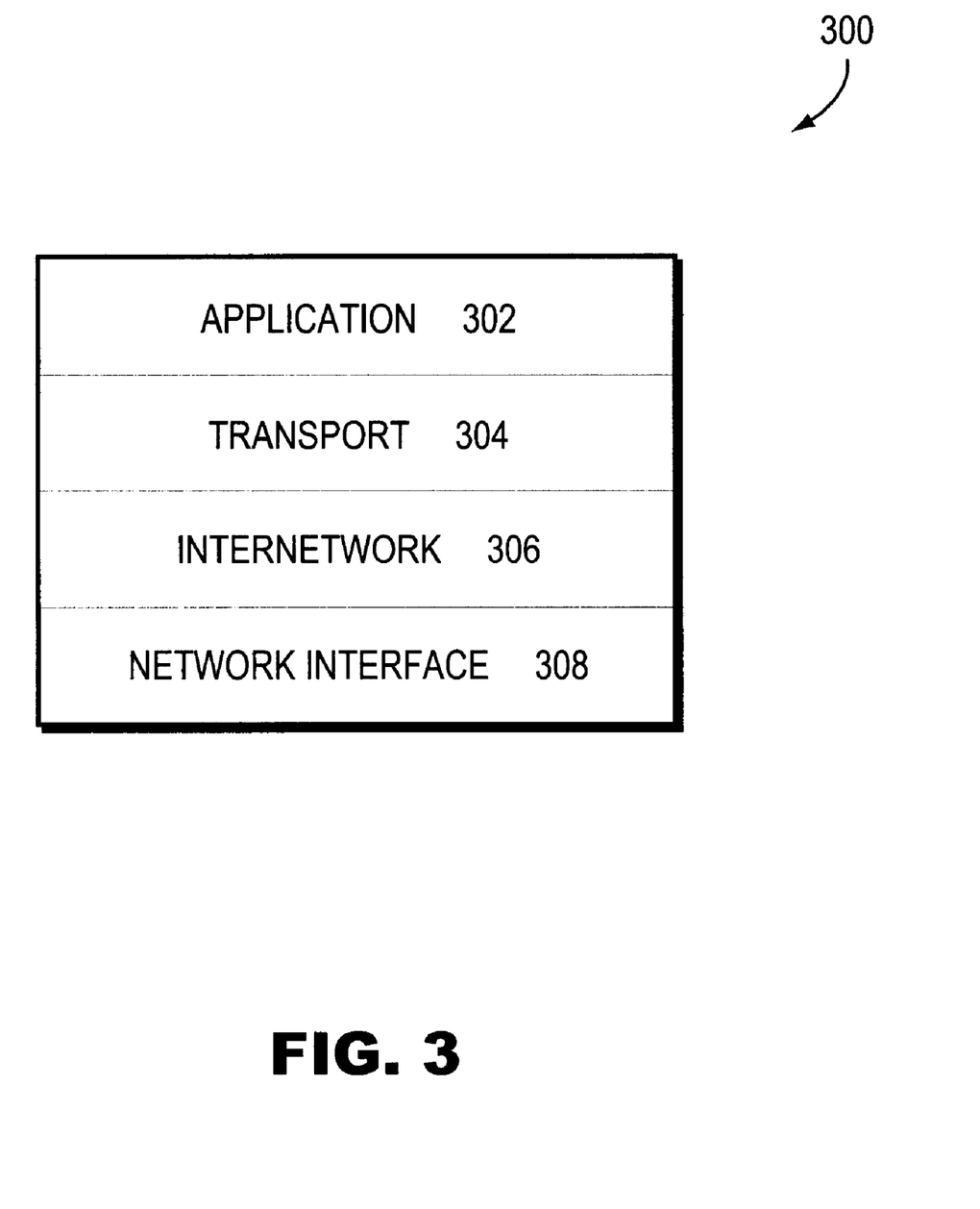
FIG. 3 is a schematic block diagram of a conventional protocol stack, such as the Internet communications protocol stack, within the interdomain router of FIG. 2.

A key function of the interdomain router is determining the next node to which a packet is sent; in order to accomplish such "routing", the interdomain routers 200 cooperate to determine optimal paths through the computer network 100. The routing function is preferably performed by an internetwork layer of a conventional protocol stack within each router. FIG. 3 is a schematic block diagram of a conventional protocol stack, such as the Internet communications protocol stack 300. The architecture of the Internet protocol stack 300 is represented by four layers termed, in ascending interfacing order, the network interface layer 308, the internetwork layer 306, the transport layer 304 and the application layer 302.

The lower network interface layer 308 is generally standardized and implemented in hardware and firmware, whereas the higher layers are typically implemented in the form of software. The primary internetwork layer protocol of the Internet architecture is the Internet Protocol (IP). IP is primarily a connectionless protocol that provides for internetwork routing, fragmentation and reassembly of exchanged packets—generally referred to as "datagrams" in an Internet environment—and which relies on transport protocols for end-to-end reliability. An example of such a transport protocol is the Transmission Control Protocol (TCP) which is implemented by the transport layer and provides connection-oriented services to the upper layer protocols of the Internet architecture. The term TCP/IP is commonly used to denote the Internet architecture.

In particular, the internetwork layer 306 concerns the protocol and algorithms that interdomain routers 200 utilize so that they can cooperate to calculate paths through the computer network 100. An interdomain routing protocol, such as the Border Gateway Protocol (BGP), is used to perform interdomain routing (for the internetwork layer) through the computer network 100. The interdomain routers 200 (hereinafter "neighboring peer routers") exchange routing and reachability information among the autonomous systems over a reliable transport layer connection, such as TCP. The BGP protocol "runs" on top of the transport layer to ensure reliable communication among the neighboring routers.

In order to perform routing operations in accordance with the BGP protocol, each interdomain router 200 maintains a routing table 206 that lists all feasible paths to a particular network within an autonomous system. The routers further exchange routing information using routing update messages 400 when their routing tables change. The routing update messages are generated by an updating router to advertise optimal paths to each of its neighboring peer routers throughout the computer network. These routing up-dates allows the BGP routers of the autonomous systems to construct a consistent and up-to-date view of the network topology.

Figure 4:
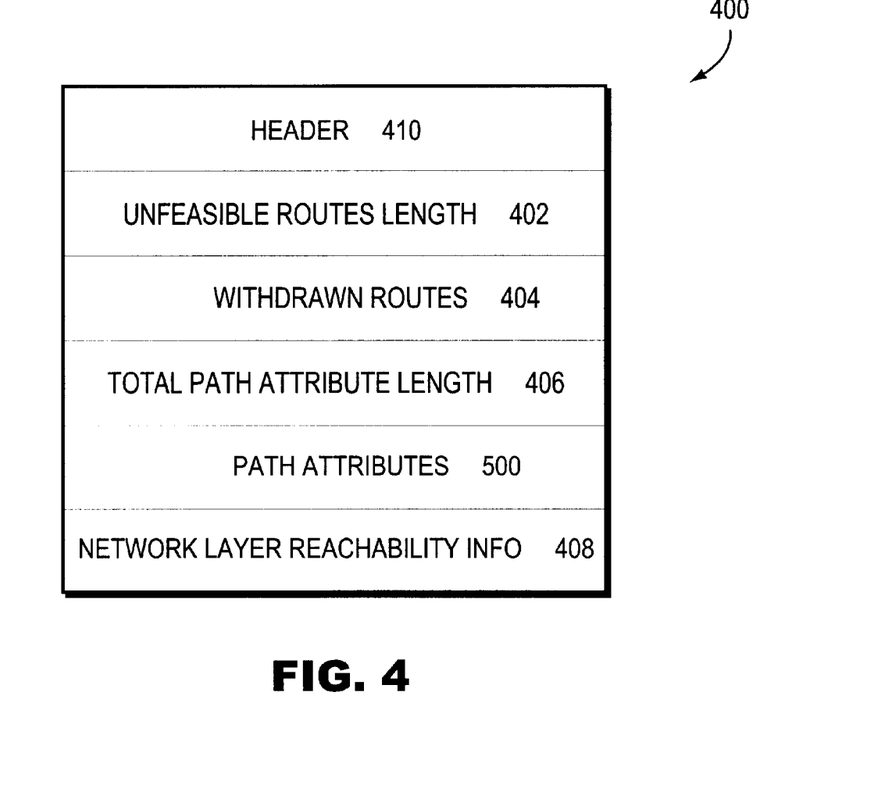
FIG. 4 is a schematic block diagram of a conventional update message, such as a Border Gateway Protocol (BGP) update message which may be advantageously used with the present invention.

FIG. 4 is a schematic block diagram of a conventional BGP update message 400 comprising a plurality of fields appended to a header 410. An unfeasible routes length field 402 indicates the total length of a withdrawn routes field 404, which contains a list of IP address prefixes for the routes being withdrawn from service. A total path attribute length field 406 indicates the total length of a path attributes field 500 and a network layer reachability information field 408 contains a list of IP address prefixes. The format and function of the update message 400 is described in *RFC 1771* and *Interconnections, Bridges and Routers*.

Figure 5:
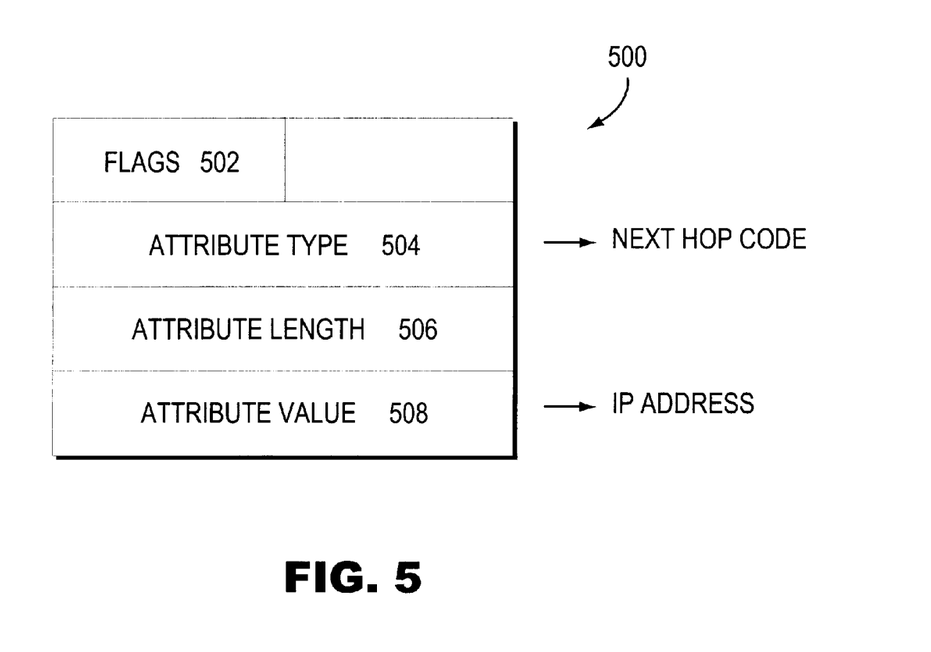
FIG. 5 is a schematic block diagram of a path attributes field of the BGP update message including an attribute type subfield which specifies a next-hop type code that may be advantageously used with the present invention.

Specifically, the path attributes field 500 comprises a sequence of fields, each describing a path attribute in the form of a triple (i.e., attribute type, attribute length, attribute value). FIG. 5 is a schematic block diagram of the path attributes field 500 comprising a plurality of subfields including a flags subfield 502, an attribute type subfield 504, an attribute length subfield 506 and an attribute value subfield 508. Of particular note to the present invention is the attribute type subfield 504 which specifies a plurality of attribute type codes, one of which is a next-hop code. The next-hop code defines an IP address of a (border) interdomain router (stored in the attribute value subfield 508) that is to be used as the "next-hop" to the destination IP addresses listed in the network layer reachability field 408 of update message 400.

The routing update messages 400 transmitted to the neighboring peer routers are typically generated by the updating router "walking-through" the routing table 206 and applying appropriate routing policies. When more than one neighbor share identical routing policies, "identical" routing messages may be sent to the neighbors if each neighbor shares a common subnet or network interface 210. As noted, generation of the routing update messages may then be optimized using a conventional group-based routing arrangement and replication process.

However if each neighbor does not share a common interface and, rather, is coupled to the updating router via, e.g., a separate point-to-point link, then a plurality of independent network interfaces $210_{A-C}$ are used and the conventional grouping and replication process cannot be employed. Here, external neighbors $RA_{A-C}$ are connected via multiple interfaces and the next-hop path attribute 500 of the update message 400 is different for each neighbor. As a result, each routing update message is typically generated separately for each neighbor, resulting in substantially higher memory and processor utilization and slower routing updates.

In accordance with the invention, an improved group-based routing update technique is provided that allows limited per neighbor customization of routing update messages generated by an interdomain router for its neighboring peer routers within autonomous systems of the computer network. The inventive technique may be employed when the neighboring peer routers share identical routing policies, but the routing update messages differ only in certain attributes with known locations and lengths. Broadly stated, appropriate values of the location and length attributes for each neighboring router are calculated and stored during a novel replication stage of the inventive technique. Before each message is transmitted, the proper location and length attributes of the message are updated with the stored values for the respective neighbor.

Figure 6:
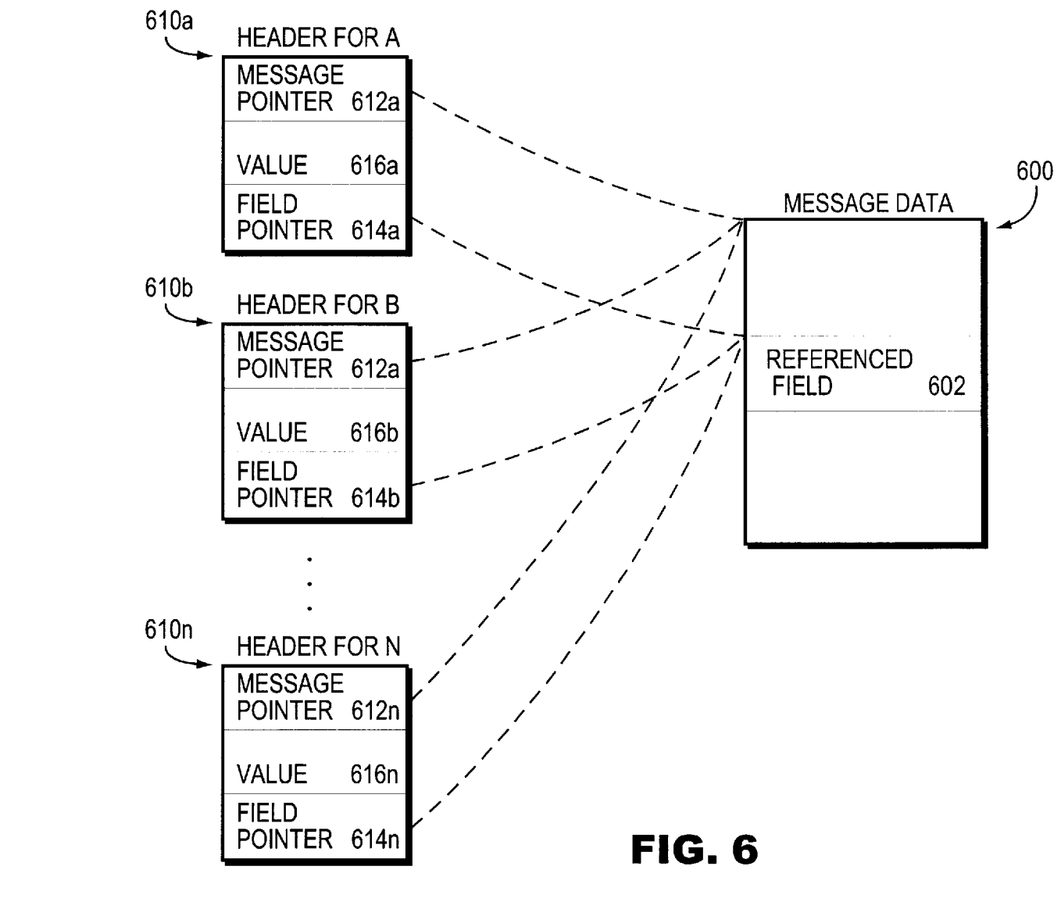
FIG. 6 is a functional block diagram illustrating an improved group-based routing update technique performed by an interdomain router when generating and transmitting routing update messages to neighboring peer routers within autonomous systems of a computer network in accordance with the present invention.

FIG. 6 is a functional block diagram illustrating the improved routing update technique performed by the route processor 202 of an interdomain router 200. According to the inventive technique, the interdomain router generates a routing update message comprising a message data portion 600 and further generates a plurality of headers 610*a–n*, each associated with a neighboring peer router. Each header is a data structure containing a plurality of pointers, one of which contains an address that references the beginning of the message data portion structure 600 stored in a memory, such as memory 204, of the interdomain router; this pointer is called the message pointer 612*a–n*. An example of the message data portion 600 may include the various fields of the BGP update message 400 (FIG. 4).

Another pointer of the header 610 contains an address that references a location (i.e., the referenced field 602) within the message data portion 600 that requires customization for each neighbor; this pointer is called the field pointer 614*a–n*. An example of the referenced field 602 may include the attribute value subfield 508 of the path attributes field 500 (FIG. 5). The header 610*a–n* further contains an actual value 616*a–n* to be loaded into the referenced field 602 for each neighbor router. An example of the value 616 loaded into field 602 may include an IP address of a next-hop interdomain router.

Operationally, the route processor 202 of the interdomain router 200 initially generates a routing update message comprising the message data portion 600 for a first neighbor A. The processor 202 also generates a first header 610*a* for neighbor A that contains the message pointer 612*a* and the field pointer 614*a*, along with a first value 616*a* to be loaded into referenced field 602 of the message data portion 600 for the neighbor A. The update message is then replicated for a second neighbor B in accordance with the replication stage of the inventive technique by creating a second header 610*b* containing the message pointer 612*b* and the field pointer 614*b*. This time, however, the header 610*b* contains a second value 616*b* to be loaded into the referenced field 602 for neighbor B. The replication process is repeated for each neighboring peer router N receiving the routing update message. Immediately before transmitting the routing message 400 to each neighbor, the content of the referenced field 602 in the message data portion 600 is replaced by the value 616 contained in the header 610 for each neighboring peer router. Thereafter, the message 400 is transmitted to each neighbor.

The improved routing technique described herein provides substantial memory and processor savings for intermediate stations performing routing updates in large networks. Instead of generating different copies of the routing update message for each neighboring peer router, a single data portion of the update message is created and only a specific field of that message is customized for each neighbor prior to transmitting the message to that neighbor. In the case of memory savings, there is only one copy of the actual message data stored in memory. The size of the header is typically much smaller than that of the actual message data, thereby saving memory resources when replicating messages. In the case of the processor, the actual message data does not need to be generated for each neighbor; rather, the route processor merely computes the values for the specific fields of the update messages for the neighbors. Thus, the inventive technique substantially conserves memory and processor resources when generating and transmitting routing update messages in a large network.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for customization of routing update messages generated by a router for a plurality of routers of a computer network, the method comprising the steps of:

creating an update message having a first portion having identical data to be sent to each router of the plurality of routers, and having a second portion to be customized for each router of the plurality of routers;

generating a customized message for a selected router, the customized message having both the first portion of identical data and having the second portion customized for the selected router;

transmitting the customized message to the selected router; and, repeating the generating step and the transmitting step to send a customized message to each router of the plurality of routers.

2. The method of claim 1 further comprising the step of storing the update message in a memory of the router.

3. The method of claim 2 further comprising the step of generating a first header for a first router of the plurality of routers, the first header comprising a message pointer referencing the identical data portion stored in the memory and a field pointer referencing the portion requiring customization for the first router.

4. The method of claim 3 wherein the step of generating the first header further comprises the step of storing a calculated attribute value for the first router in the first header.

5. The method of claim 4 further comprising the step of generating a second header for a second router, the second header comprising the message pointer referencing the identical data portion stored in the memory and the field pointer referencing the data portion requiring customization for the second router.

6. The method of claim 5 wherein the step of generating the second header further comprises the step of storing a calculated attribute value for the second router in the second header.

7. The method of claim 6 further comprising the step of generating a header for each remaining router, the header comprising the message pointer referencing the identical data portion stored in the memory and the field pointer referencing the data portion requiring customization for each remaining router.

8. The method of claim 7 wherein the step of generating the header further comprises the step of storing a calculated attribute value for each remaining router in each remaining header.

9. Apparatus for customization of routing update messages generated by a router for a plurality of routers of a computer network, the apparatus comprising:

a processor for calculating an attribute value for each neighboring router;

a memory coupled to the processor;

an update message structure stored in the memory, the update message having a first portion having identical data to be sent to each router of the plurality of routers, and having a second portion to be customized for each router of the plurality of routers, wherein the update message is adapted to be customized for a selected router, the customized message having both the first portion of identical data and having the second portion customized for the selected router; and a plurality of header structures stored in the memory, each header structure associated with a router of the plurality of routers and containing (i) a plurality of pointers and (ii) the attribute value calculated by the processor for each router.

10. The apparatus of claim 9 wherein one of the plurality of pointers comprises a field pointer containing an address of the portion to be customized within the identical data portion and wherein the calculated attribute value contained within each header is loaded into a referenced field of the portion to be customized prior to transmitting the update message.

11. The apparatus of claim 10 wherein routers are inter-domain peer routers within autonomous systems of the computer network and wherein the routing update message is a border gateway protocol (BGP) update message.

12. The apparatus of claim 11 wherein the calculated attribute value is an internet protocol (IP) address of the router functioning as a next-hop interdomain router to a destination IP address.

13. A method for customization of routing update messages by a router, the method comprising the steps of:

creating a header for an update message for each neighboring router of a plurality of neighboring routers, the header containing a message pointer which points to a beginning of a message data structure, the message data structure having a plurality of fields including an identical message data field, and the header containing a field pointer pointing to a referenced field in the message data structure which is to be updated, the header also containing a field having a value to be written into the referenced field, wherein the value is associated with a selected neighboring router of the plurality of neighboring routers;

generating an update message to transmit to the selected neighboring router by replicating the identical message data structure in response to the message pointer, and by writing said value into the referenced field in response to the field pointer;

transmitting the update message to the selected neighboring router; and, repeating the generating step and transmitting step for each of the plurality of neighboring routers.

14. The method of claim 13 further comprising:

pointing, by the message pointer, to a memory location in the router, the memory location marking the beginning of the message data structure.

15. The method of claim 13 in which the referenced field pointed to by the field pointer is within the message data structure in memory, and further comprising:

updating the referenced field in memory with the value at the location in memory specified by the field pointer.

16. A method for customization of routing update messages by a router, the method comprising the steps of:

creating a header for an update message for each of a plurality of neighboring routers, the header containing a message pointer which points to a beginning of a message data structure, the message data structure having a plurality of fields, and the header containing a field pointer pointing to a referenced field in the message data structure which is to be updated, the header also containing a field having a value to be written into the referenced field;

generating an update message to transmit to a selected neighboring router by replicating the message data structure in response to the message pointer, and by writing the value into the referenced field in response to the field pointer;

transmitting the update message to the selected neighboring router;

creating a plurality of headers, one for each of the plurality of neighbors, before executing the generating and transmitting steps; and, repeating the generating step and transmitting step for each of the plurality of neighboring routers.

17. An apparatus for customization of routing update messages by a router, the apparatus comprising:

a header creation process for creating a header for an update message for each of a plurality of neighboring routers, the header containing a message pointer which points to a beginning of a message data structure, the message data structure having a plurality of fields including an identical message data field, and the header containing a field pointer pointing to a referenced field in the message data structure which is to be updated, the header also containing a field having a value to be written into the referenced field, wherein the value is associated with one of the plurality of neighboring routers;

an update message generation process for generating an update message to transmit to a selected neighboring router, the generation process having a subprocess for replicating the identical message data structure in response to the message pointer, and a subprocess for writing the value into the referenced field in response to the field pointer;

an update message transmit process for transmitting the update message to the selected neighboring router; and, a loop process for repeating the update message generation process and the update message transmit process for each of the plurality of neighboring routers.

18. The apparatus of claim 17 further comprising:

a memory reference process for pointing, by the message pointer, to a memory location in the router, the memory location marking the beginning of the message data structure.

19. The apparatus of claim 17 in which the referenced field pointed to by the field pointer is within the message data structure in memory, and further comprising:

a memory update process for updating the referenced field in memory with the value at the location specified by the field pointer.

20. An apparatus for customization of routing update messages by a router, the apparatus comprising:

a header creation process for creating a header for an update message for each of a plurality of neighboring routers, the header containing a message pointer which points to a beginning of a message data structure, the message data structure having a plurality of fields including an identical message data field, and the header containing a field pointer pointing to a referenced field in the message data structure which is to be updated, the header also containing a field having a value to be written into the referenced field, wherein the value is associated with one of the plurality of neighboring routers;

an update message generation process for generating an update message to transmit to a selected neighboring router, the generation process having a subprocess for replicating the identical message data structure in response to the message pointer, and a subprocess for writing the value into the referenced field in response to the field pointer;

an update message transmit process for transmitting the update message to the selected neighboring router;

a header replication process for creating a plurality of headers, one for each of the plurality of neighbors, before executing the update message generation process and the update message transmit process; and, a loop process for repeating the update message generation process and the update message transmit process for each of the plurality of neighboring routers.

21. An apparatus for customization of routing update messages by a router, the apparatus comprising:

means for creating a header for an update message for each of a plurality of neighboring routers, the header containing a message pointer which points to a beginning of a message data structure, the message data structure having a plurality of fields including an identical message data field, and the header containing a field pointer pointing to a referenced field in the message data structure which is to be updated, the header also containing a field having a value to be written into the referenced field, wherein the value is associated with one of the plurality of neighboring routers;

means for generating an update message to transmit to a selected neighboring router by replicating the identical message data structure in response to the message pointer, and by writing the value into the referenced field in response to the field pointer;

means for transmitting the update message to the selected neighboring router; and, means for repeating the means for generating and the means for transmitting for each of the plurality of neighboring routers.

22. The apparatus of claim 21 further comprising:

a means for pointing, by the message pointer, to a memory location in the router, the memory location marking the beginning of the message data structure.

23. The apparatus of claim 21 in which the referenced field pointed to by the field pointer is within the message data structure in memory, and further comprising:

a means for updating the referenced field in memory with the value at the location specified by the field pointer.

24. An apparatus for customization of routing update messages by a router, the apparatus comprising:

means for creating a header for an update message for each of a plurality of neighboring routers, the header containing a message pointer which points to a beginning of a message data structure, the message data structure having a plurality of fields including an identical message data field, and the header containing a field pointer pointing to a referenced field in the message data structure which is to be updated, the header also containing a field having a value to be written into the referenced field, wherein the value is associated with one of the plurality of neighboring routers;

means for generating an update message to transmit to a selected neighboring router by replicating the identical message data structure in response to the message pointer, and by writing the value into the referenced field in response to the field pointer;

means for transmitting the update message to the selected neighboring router;

a means for creating a plurality of headers, one for each of the plurality of neighbors, before executing the means for generating and the means for transmitting; and, means for repeating the means for generating and the means for transmitting for each of the plurality of neighboring routers.

25. A node for carrying out the method according to claim 1 or claim 13, or claim 24.

26. A packet switching communication network comprising at least one node for the practice of the method according to claim 1 or claim 13 or claim 16.

27. Electromagnetic signals travelling over a computer network comprising:

the electromagnetic signals to execute in a node carrying information for the practice according to the method of claim 1 or claim 13 or claim 16.

28. A computer readable medium containing executable program instructions for customization of routing update messages by a router according to the method of claim 1 or claim 13 or claim 16.

* * * * *